United States Patent
Yu

(10) Patent No.: US 7,413,207 B2
(45) Date of Patent: Aug. 19, 2008

(54) FRONT FORK FOR A BICYCLE

(75) Inventor: Kuo-Pin Yu, Taichung (TW)

(73) Assignee: Yuan Min An Enterprise Co., Ltd., Taichung (TW)

( * ) Notice: Subject to any disclaimer, the term of this patent is extended or adjusted under 35 U.S.C. 154(b) by 0 days.

(21) Appl. No.: 11/500,479

(22) Filed: Aug. 8, 2006

(65) Prior Publication Data

US 2007/0063476 A1    Mar. 22, 2007

(30) Foreign Application Priority Data

Sep. 16, 2005   (TW) ............................... 94132129 A

(51) Int. Cl.
*B62K 21/02* (2006.01)
(52) U.S. Cl. .................................... 280/279; 280/288.3
(58) Field of Classification Search ................. 280/279, 280/288.3
See application file for complete search history.

(56) References Cited

U.S. PATENT DOCUMENTS

| | | | | |
|---|---|---|---|---|
| 4,828,285 A | * | 5/1989 | Foret et al. ................... | 280/279 |
| 5,016,895 A | * | 5/1991 | Hollingsworth et al. ..... | 280/280 |
| 5,059,057 A | | 10/1991 | Graef | |
| 5,181,732 A | * | 1/1993 | Bezin et al. .................. | 280/279 |
| 6,352,276 B1 | | 3/2002 | Hill | |
| 6,431,574 B1 | * | 8/2002 | Gueugneaud ............... | 280/279 |

FOREIGN PATENT DOCUMENTS

| | | | |
|---|---|---|---|
| EP | 275797 A1 | * | 7/1988 |
| WO | 9915395 A | | 4/1999 |

\* cited by examiner

*Primary Examiner*—Lesley D. Morris
*Assistant Examiner*—Daniel Yeagley
(74) *Attorney, Agent, or Firm*—Browdy & Neimark

(57) ABSTRACT

A front fork for a bicycle includes an upright tube and two arms all of which are made of fiber reinforced material. The two arms extend substantially parallel from a bottom of the upright tube. The two arms each have two inner tubes abutted together and an outer tube sleeved onto the two inner tubes. The abutted portions of the two inner tubes form a rib which is parallel to a plane where the two arms are disposed. Thus, the front fork has strong structure and light weight.

4 Claims, 4 Drawing Sheets

FRONT FORK FOR A BICYCLE

BACKGROUND OF THE INVENTION

1. Field of the Invention

The present invention relates to a bicycle and more particularly to such a front fork for a bicycle, which has strong structure and light weight.

2. Description of the Related Art

A conventional front fork for a bicycle is made of metal. Recently, the bicycle is developed towards reducing its weight and adopts fiber reinforced material. As shown in FIG. 1, the front fork 1 is made of carbon fiber reinforced resin. The front fork 1 is manufactured by winding multiple layers of pre-pregs into two elongated tubes 2, placing the elongated tubes 2 into a die 3 and winding pre-pregs 4 around predetermined position for enhancement, inflating the elongated tubes 2 to make the elongated tubes 2 abut on an inner wall of the die 3, and curing the elongated tubes 2 and the pre-pregs 4 to form the front fork 1.

The front fork 1 has an upright tube 5 and two arms 6 extending from a bottom of the upright tube 5. As shown in FIG. 1, the two arms 6 each consist of an elongated tube 2, which does not has enough structural strength. It's easy to break, especially when the arms 6 encounter lateral stress. If the quantity of the pre-pregs used in the front fork 1 is increased for enhancing the structural strength, the weight of the product is unintentionally increased. Therefore, there is always a problem as to how to reduce the weight of the front fork and increase the structural strength at the same time.

SUMMARY OF THE INVENTION

The primary objective of the present invention is to provide a front fork for a bicycle, which has high structural strength and light weight.

The other objective of the present invention is to provide a front fork for a bicycle, which has an arm having high resistance to lateral stress.

The foregoing objectives of the present invention are attained by the front fork that includes an upright tube and two arms, all of which are made of fiber reinforced material. The two arms extend substantially parallel from a bottom of the upright tube. The two arms each have two inner tubes abutted together and an outer tube sleeved onto the two inner tubes. The abutted portions of the two inner tubes form a rib which is parallel to a plane where the two arms are disposed. Thus, the front fork has strong structure and light weight.

DETAILED DESCRIPTION OF THE INVENTION

Figure 1:
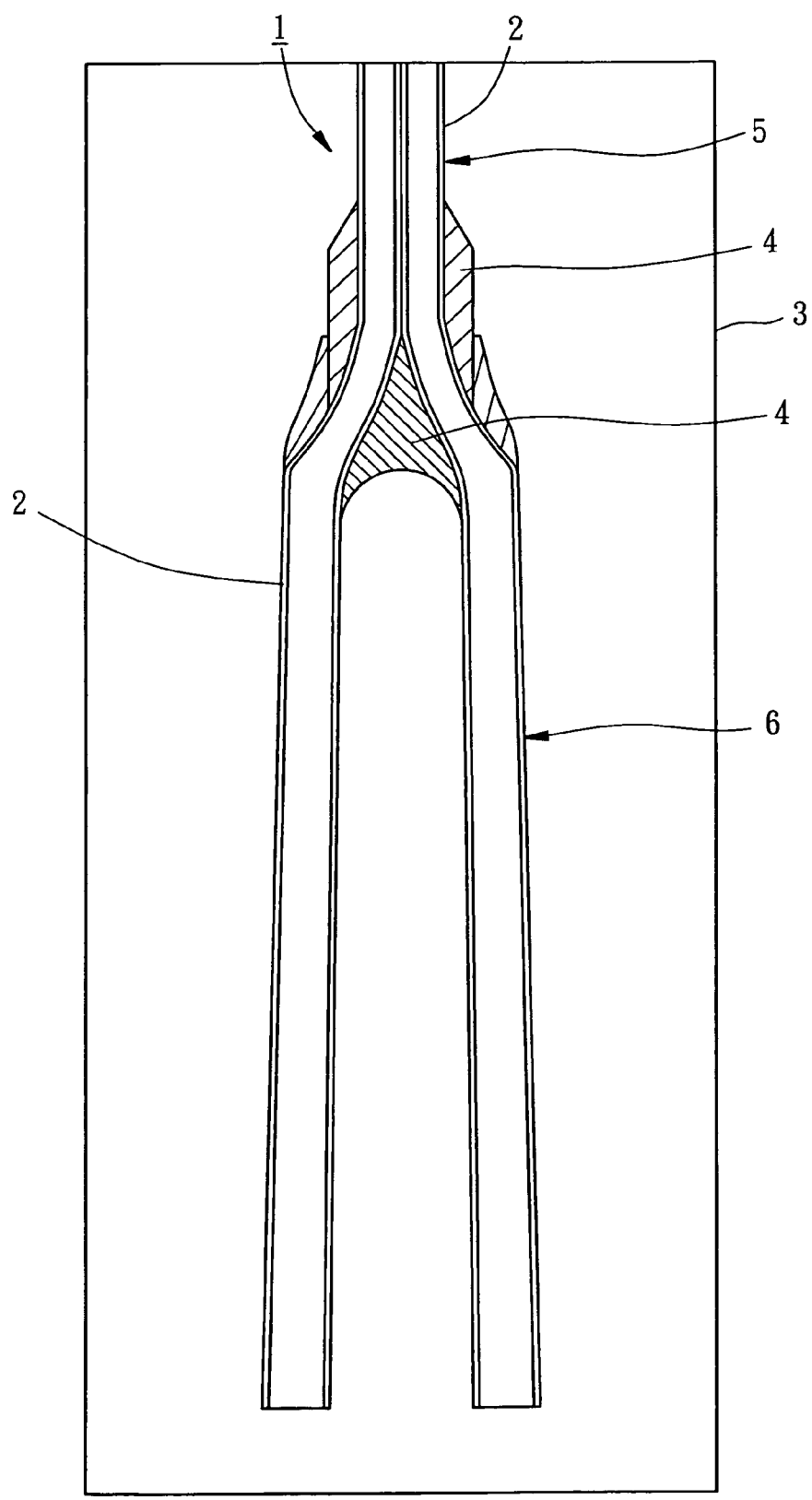
FIG. 1 is a sectional view of a conventional front fork.
Figure 2:
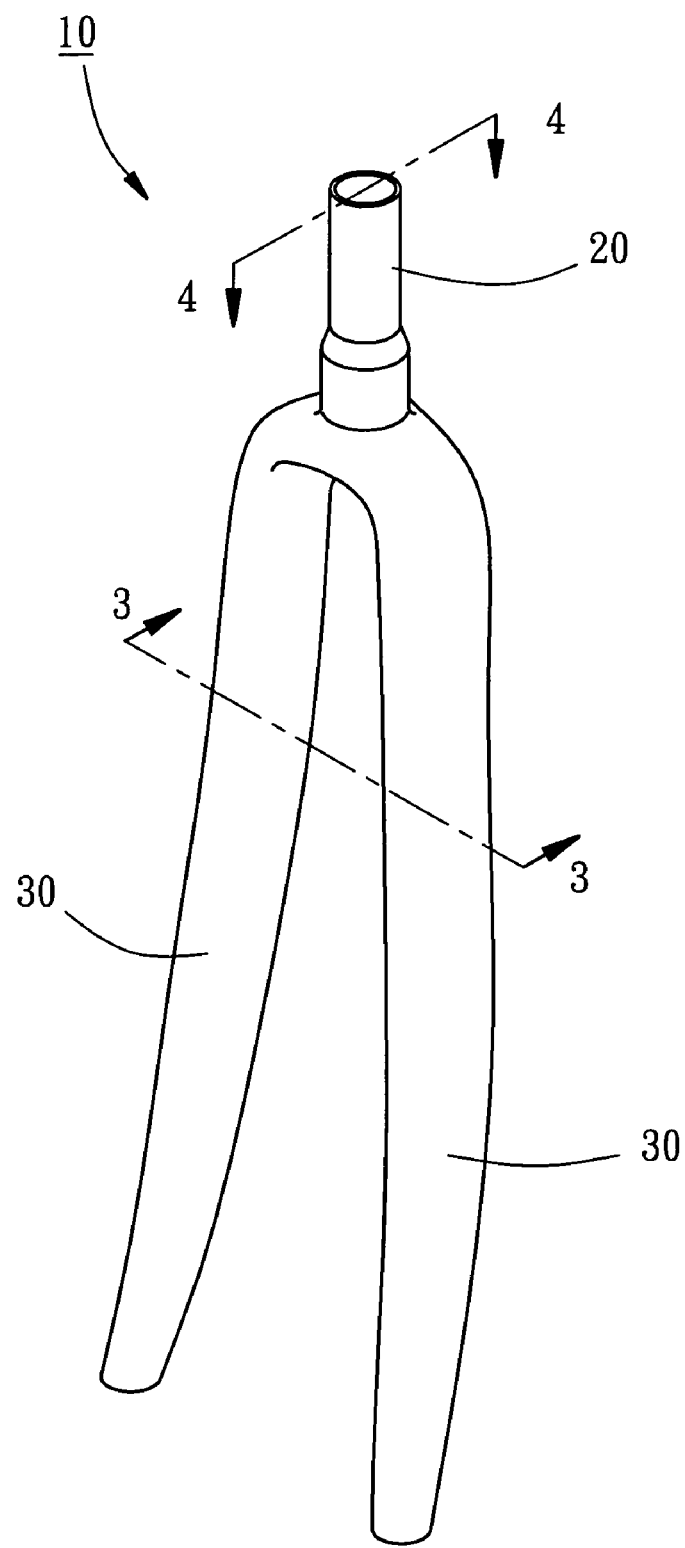
FIG. 2 is a perspective view of a first preferred embodiment of the present invention.
Figure 3:
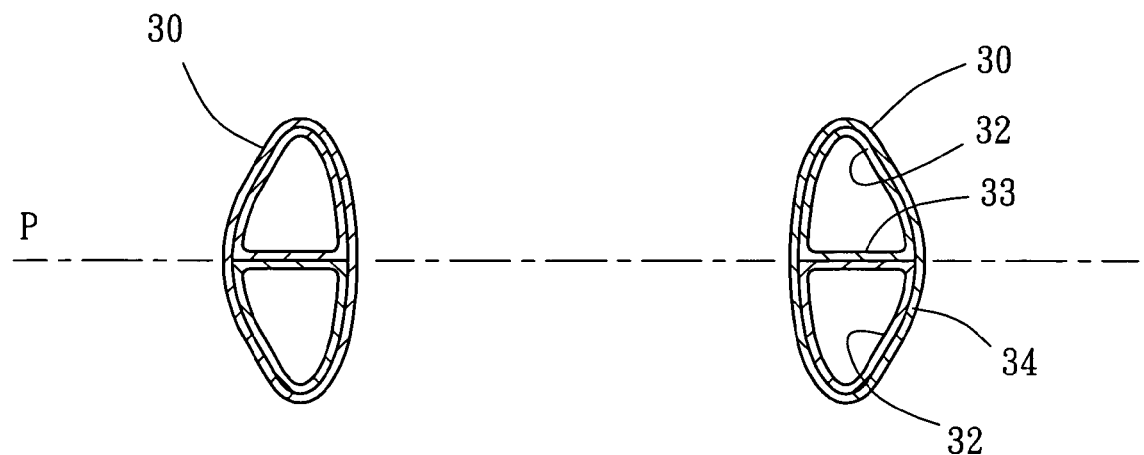
FIG. 3 is a sectional view along the 3-3 line in FIG. 2.
Figure 4:
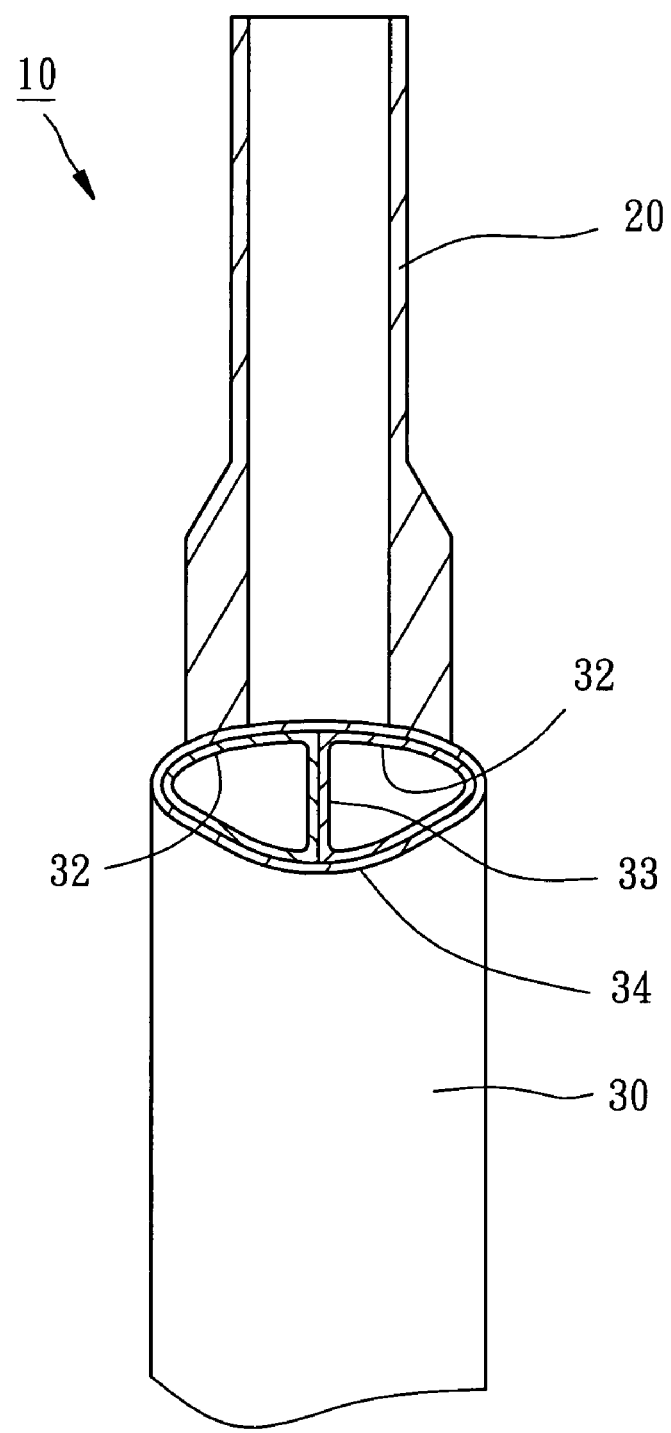
FIG. 4 is a sectional view along the 4-4 line in FIG. 2.

Referring to FIGS. 2-4, a front fork 10 for a bicycle in accordance with the first preferred embodiment of the present invention is shown comprising an upright tube 20 and two arms 30 all of which are made of fiber reinforced resin material. The fiber can be but is not redirected to carbon fiber, glass fiber, boron fiber or Kevlar® fiber. The resin can be a thermosetting resin or a thermoplastic resin.

The upright tube 20 is a straight tube for connecting with a steering handle (not shown). The two arms 30, which are disposed at a plane P, extend substantially parallel from a bottom of the upright tube 20. As shown in FIGS. 3-4, the two arms 30 each have two inner tubes 32 abutted together and an outer tube 34 sleeved onto the two inner tubes 32. The outer tube 34 and the two inner tubes 32 are closely contacted without a gap therebetween. The abutted portions of the two inner tube 32 form a rib 33 substantially parallel to the plane P.

The arms 30 are manufactured by abutting two inner tubes 32 together, winding multiple layers of pre-pregs around the two inner tubes 32 to form the outer tube 34, connecting the middle part of the combination of the tubes 32, 34 with the bottom of the upright tube 20, placing the combination of the tubes 32, 34 into a die (not shown), inflating the inner tubes 32 by high pressure air to make the outer tubes 34 expand and abut on an inner wall of the die, and curing the combination of the tubes 32, 34.

The structural strength of the arms 30 is enhanced remarkably since the arms 30 each have a rib 33 therein. The arms 30 can bear great lateral stress particularly since the ribs 33 are parallel to the plane P. Therefore, the front fork 10 of the present invention can improve the drawback of the conventional structure and achieve the objectives of the present invention. Besides, under the premise that the structural strength of the front fork 10 is enough, the quantity of the pre-pregs used in the front fork 10 can be reduced such that the weight of the front fork 10 can be decreased.

Figure 5:
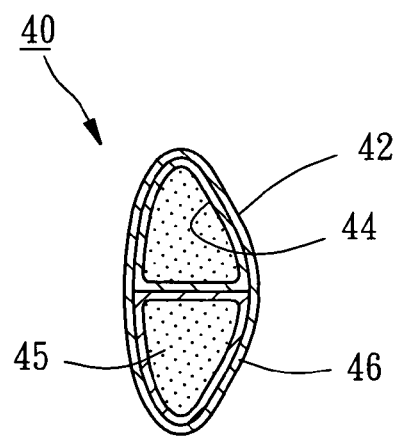
FIG. 5 is a sectional view of a second preferred embodiment of the present invention.

As shown in FIG. 5, the arm 42 of front fork 40 for a bicycle in accordance with the second preferred embodiment of the present invention has two inner tubes 44 and an outer tube 46. The two inner tubes 44 are filled with foam material in advance. A foamed core 45 is formed by the foam material by heating. The foamed core 45 expands and makes the outer tube 46 abut on the inner wall of the die (not shown). The front fork 40 is cured after a predetermined period of time and the foamed core 45 is filled in the inside of the two inner tubes 44.

In practice, the foam material and high pressure air can be used alone or cooperatively to make the outer tube abut on the inner wall of the die. The quantity or the position of the rib can be changed according to user's demand. For example, the arm, which has three inner tubes, has two ribs formed between the three inner tubes. Although particular embodiments of the invention have been described in detail for purposes of illustration, various modifications and enhancements may be made without departing from the spirit and scope of the invention.

What is claimed is:

1. A front fork for a bicycle, comprising:
an upright tube made of fiber reinforced material; and
first arm and a second arm made of fiber reinforced material and extending substantially parallel from a bottom of the upright tube, wherein the two arms each have two inner tubes abutted together and an outer tube sleeved onto the two inner tubes; wherein the abutted portions of the two inner tube form a rib; and wherein the two inner tubes of the first arm are integrally connected to the two inner tubes of the second arm, and the outer tube of the first arm is integrally connected to the outer tube of the second arm.

2. The front fork for a bicycle as claimed in claim 1, wherein the two arms are disposed substantially at a same plane and the ribs are substantially parallel to the plane.

3. The front fork for a bicycle as claimed in claim 1, wherein the outer tube and the two inner tubes are closely contacted without a gap therebetween.

4. The front fork for a bicycle as claimed in claim 1, further comprising a foamed core filled in an inside of one of the inner tubes.

* * * * *